US011634990B2

(12) United States Patent
Dyson et al.

(10) Patent No.: US 11,634,990 B2
(45) Date of Patent: Apr. 25, 2023

(54) COMPONENT WITH MECHANICAL LOCKING FEATURES INCORPORATING ADAPTIVE COOLING AND METHOD OF MAKING

(71) Applicant: General Electric Company, Schenectady, NY (US)

(72) Inventors: Earl Thomas Dyson, Niskayuna, NY (US); Tyler Henson, Greenville, SC (US); Brendon Leary, Greenville, SC (US); Zachary Snider, Greenville, SC (US); Gregory Thomas Foster, Greenville, SC (US); Victor Morgan, Greenville, SC (US); James Tallman, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/263,360

(22) PCT Filed: Jul. 31, 2018

(86) PCT No.: PCT/US2018/044714
§ 371 (c)(1),
(2) Date: Jan. 26, 2021

(87) PCT Pub. No.: WO2020/027823
PCT Pub. Date: Feb. 6, 2020

(65) Prior Publication Data
US 2021/0324742 A1 Oct. 21, 2021

(51) Int. Cl.
*F01D 5/14* (2006.01)
*F01D 5/18* (2006.01)
(Continued)

(52) U.S. Cl.
CPC ............... *F01D 5/147* (2013.01); *F01D 5/18* (2013.01); *F05D 2230/12* (2013.01);
(Continued)

(58) Field of Classification Search
CPC . F01D 5/147; F01D 5/005; F01D 5/20; F01D 5/288; F01D 5/3007; F01D 5/187;
(Continued)

(56) References Cited

U.S. PATENT DOCUMENTS 6,493,936 B2   12/2002   Doi et al.
6,749,396 B2   6/2004    Barry et al.
(Continued)

FOREIGN PATENT DOCUMENTS

JP   2008169843 A   7/2008
JP   2011153622 A   8/2011
JP   2017082772 A   5/2017

OTHER PUBLICATIONS

International Preliminary Report on Patentability for corresponding PCT Application No. PCT/US2018/044714 dated Apr. 18, 2019, 9 pages.
(Continued)

*Primary Examiner* — Eric J Zamora Alvarez
(74) *Attorney, Agent, or Firm* — James Pemrick; Charlotte Wilson; Hoffman Warnick LLC

(57) ABSTRACT

A hot gas path component assembly includes a first component portion that includes a first set of interlocking features and a second component portion that includes a second set of interlocking features mechanically coupled to the first set of interlocking features. A fill material is disposed at an interface between at least one surface of the first set of interlocking features and at least one surface of the second set of interlocking features. The fill material is disposed during a joining process. The second component
(Continued)

portion is joined to the first component portion via both the fill material and the first and second sets of interlocking features.

14 Claims, 12 Drawing Sheets

(51) Int. Cl.
    *F01D 5/20*            (2006.01)
    *F01D 5/00*            (2006.01)

(52) U.S. Cl.
    CPC .... *F05D 2230/21* (2013.01); *F05D 2230/237* (2013.01); *F05D 2240/304* (2013.01); *F05D 2240/307* (2013.01); *F05D 2250/11* (2013.01); *F05D 2260/20* (2013.01); *F05D 2260/36* (2013.01)

(58) Field of Classification Search
    CPC . F01D 5/18; F01D 5/282; F01D 5/284; F01D 25/06; F01D 5/141; F01D 5/22; F01D 25/12; F01D 25/285; F01D 5/186; F05D 2240/307; F05D 2230/90; F05D 2260/36; F05D 2230/80; F05D 2230/60; F05D 2240/24; F05D 2240/81; F05D 2260/30; F05D 2260/96; F05D 2230/12; F05D 2230/21; F05D 2230/50; F05D 2230/51; F05D 2230/64; F05D 2230/237; F05D 2240/304; F05D 2230/642; F05D 2230/68; F05D 2250/11; F05D 2260/20; B23P 15/04; B23P 6/007; B23P 6/005; B23P 6/002; Y02T 50/60
    See application file for complete search history.

(56) References Cited

U.S. PATENT DOCUMENTS

| | | | |
|---|---|---|---|
| 7,762,783 | B2 | 7/2010 | Cairo et al. |
| 8,398,374 | B2 | 3/2013 | Roberts et al. |
| 8,678,764 | B1 | 3/2014 | Kimmel |
| 9,394,795 | B1 | 7/2016 | Kimmel et al. |
| 9,598,967 | B2 | 3/2017 | Xu |
| 10,267,156 | B2 | 4/2019 | Davidson et al. |
| 2007/0036942 | A1 | 2/2007 | Steele |
| 2011/0189015 | A1 | 8/2011 | Shepherd |
| 2013/0104517 | A1 | 5/2013 | Correia et al. |
| 2014/0255194 | A1 | 9/2014 | Jones |
| 2015/0345307 | A1 | 12/2015 | Davidson et al. |
| 2015/0345309 | A1 | 12/2015 | Davidson et al. |
| 2016/0201556 | A1 | 7/2016 | Kolvick et al. |
| 2016/0333740 | A1 | 11/2016 | Sluyter et al. |
| 2017/0106482 | A1 | 4/2017 | Roberts et al. |
| 2017/0107823 | A1* | 4/2017 | Roberts ..................... F01D 5/22 |

OTHER PUBLICATIONS

International Search Report and Written Opinion for corresponding PCT Application No. PCT/US18/044714 dated Apr. 18, 2019, 11 pages.
Notice of Reasons for Refusal and English Translation thereof for corresponding JP Application No. 2021-504810 dated Jun. 8, 2022, 11 pages.

* cited by examiner

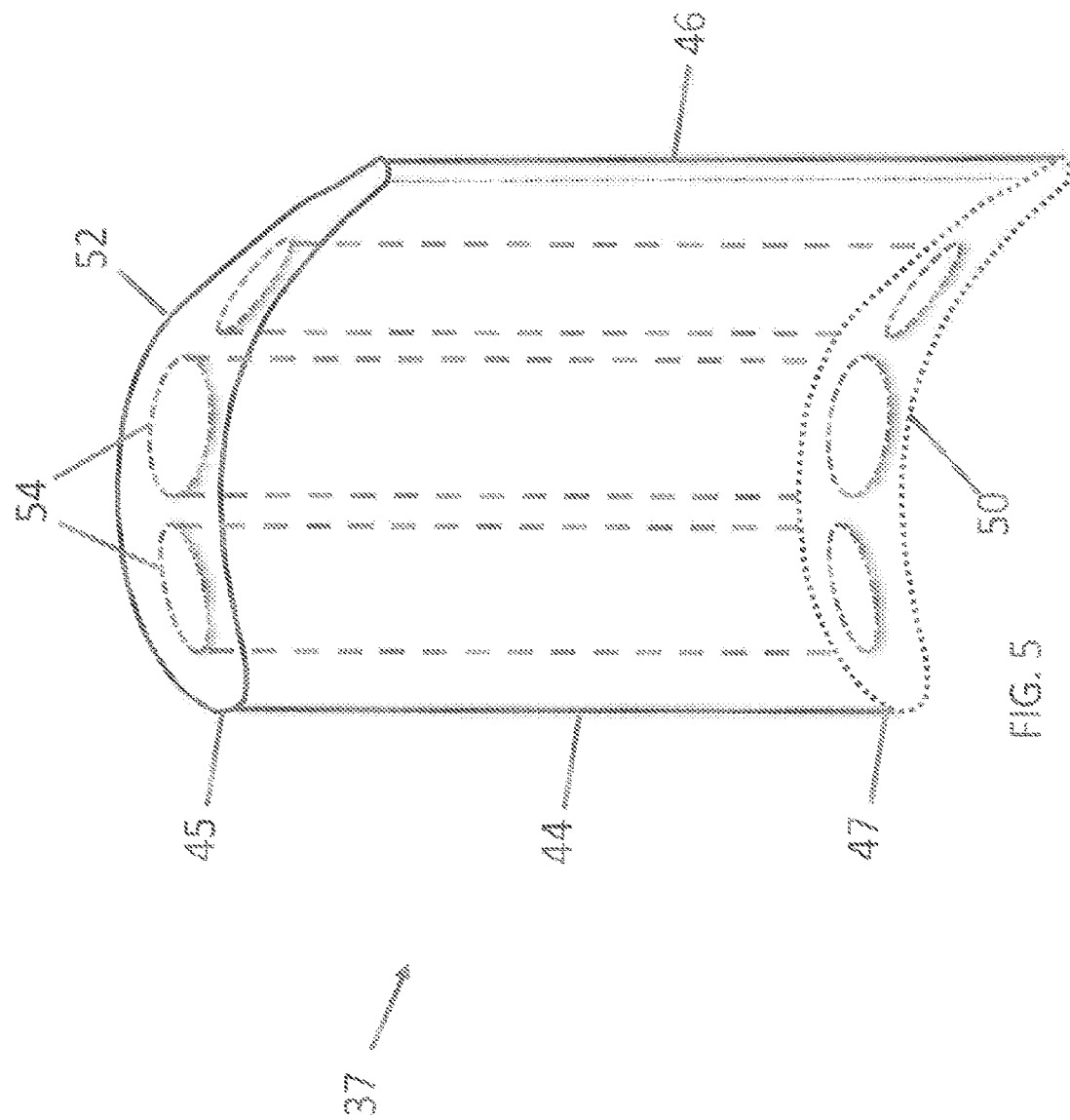

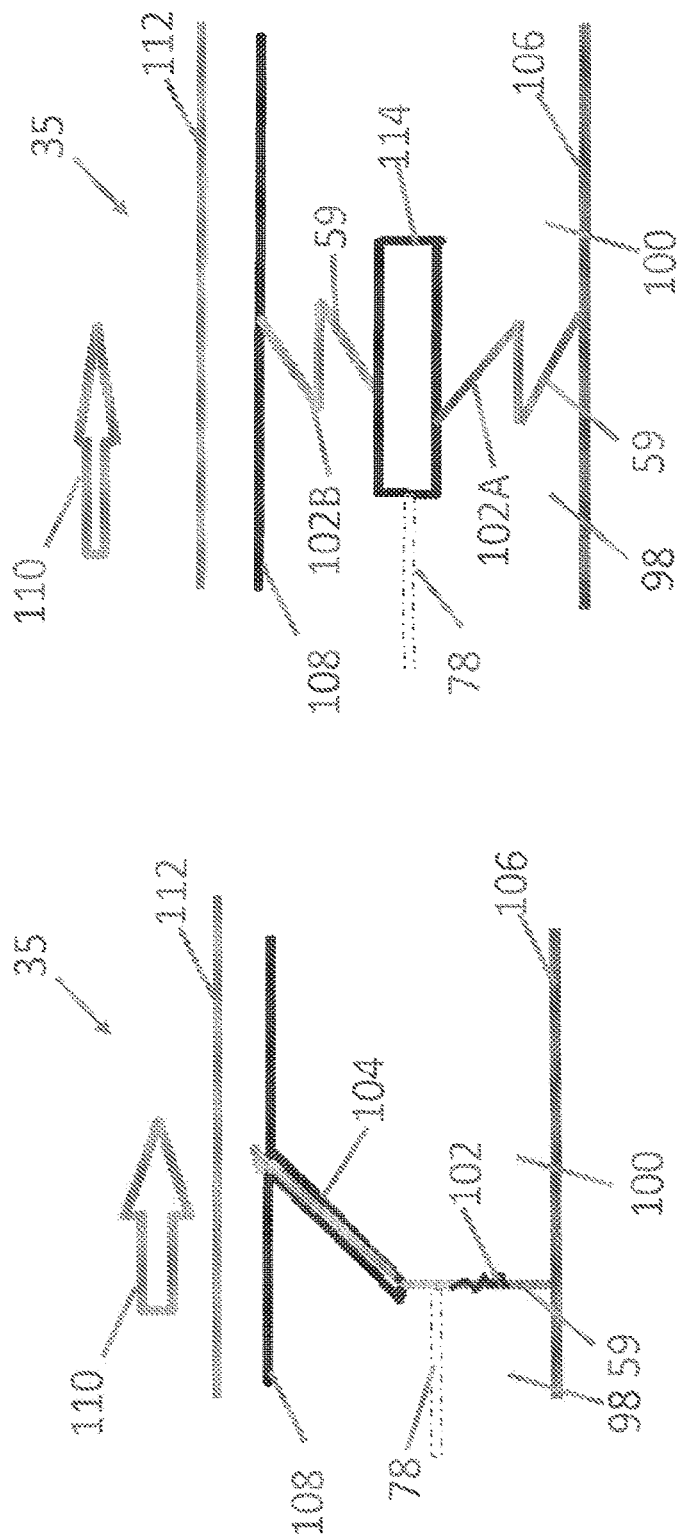

COMPONENT WITH MECHANICAL LOCKING FEATURES INCORPORATING ADAPTIVE COOLING AND METHOD OF MAKING

BACKGROUND

The disclosure relates generally to cooled structures of a gas turbine and more specifically systems and methods relating to turbine airfoils.

In a large frame heavy-duty industrial gas turbine engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by passing a higher temperature gas stream into the turbine. However, the turbine inlet temperature may be limited to the material properties of the turbine, especially the first stage vanes and blades, and an amount of cooling capability for these first stage airfoils.

The first stage rotor and stator components are exposed to the highest gas stream temperatures, with the temperature gradually decreasing as the gas stream passes through the turbine stages. The first and second stage airfoils (blades and vanes) should be cooled by passing cooling air through inters all cooling passages and discharging the cooling air through film cooling holes to provide a blanket layer of cooling air to protect the cooled surface from the hot gas stream.

The turbine rotor blades are often formed using investment casting and metallic super-alloy materials, which have high tolerance to mechanical stress and strain, as well as thermal stresses and gradients. However, the geometries and features that can be formed via the investment casting process are limited.

SUMMARY

Aspects and advantages of the disclosure will be set forth in part in the following description, or may be learned through practice of the disclosure.

In one embodiment, a hot gas path component assembly includes a first component portion which includes a first set of interlocking features, a second component portion which includes a second set of interlocking features mechanically coupled to the first set of interlocking features, and fill material disposed at an interface between at least one surface of the first set of interlocking features and at least one surface of the second set of interlocking features. The fill material is disposed during a joining process. The second component portion is joined to the first component portion via both the fill material and the first and second sets of interlocking features.

In another embodiment, a structure includes a first structure portion, a second structure portion joined to the first structure portion, the second structure portion and the first structure portion collectively forming a first substrate surface that is exposed to hot fluid, fill material at an interface between the first structure and the second structure portion, and at least one adaptive cooling passage which includes a first end fluidly connected to a cooling source; and a second end disposed at the interface between the first structure and the second structure portion. The cooling fluid flows into the interface between the first structure and the second structure portion only if there is a discontinuity in the fill material.

In another embodiment, a method of forming an airfoil includes casting an airfoil body portion with a first set of interlocking features, forming a second airfoil portion with a second set of interlocking features that mechanically interlock with the first set of interlocking features, performing at least one of: co-drilling via electrical discharge machining (EDM) the airfoil body portion and the second airfoil portion, and surface finishing the airfoil body portion and the second airfoil portion, assembling the interlocking features of the airfoil body portion and the second airfoil portion, and joining the airfoil body portion and the second airfoil portion via a brazing process.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which:

FIG. 5 illustrates a perspective view of an airfoil body portion;

FIG. 16 illustrates an embodiment of an airfoil assembly;

FIG. 17 illustrates an embodiment of an airfoil assembly; and

Figure 1:
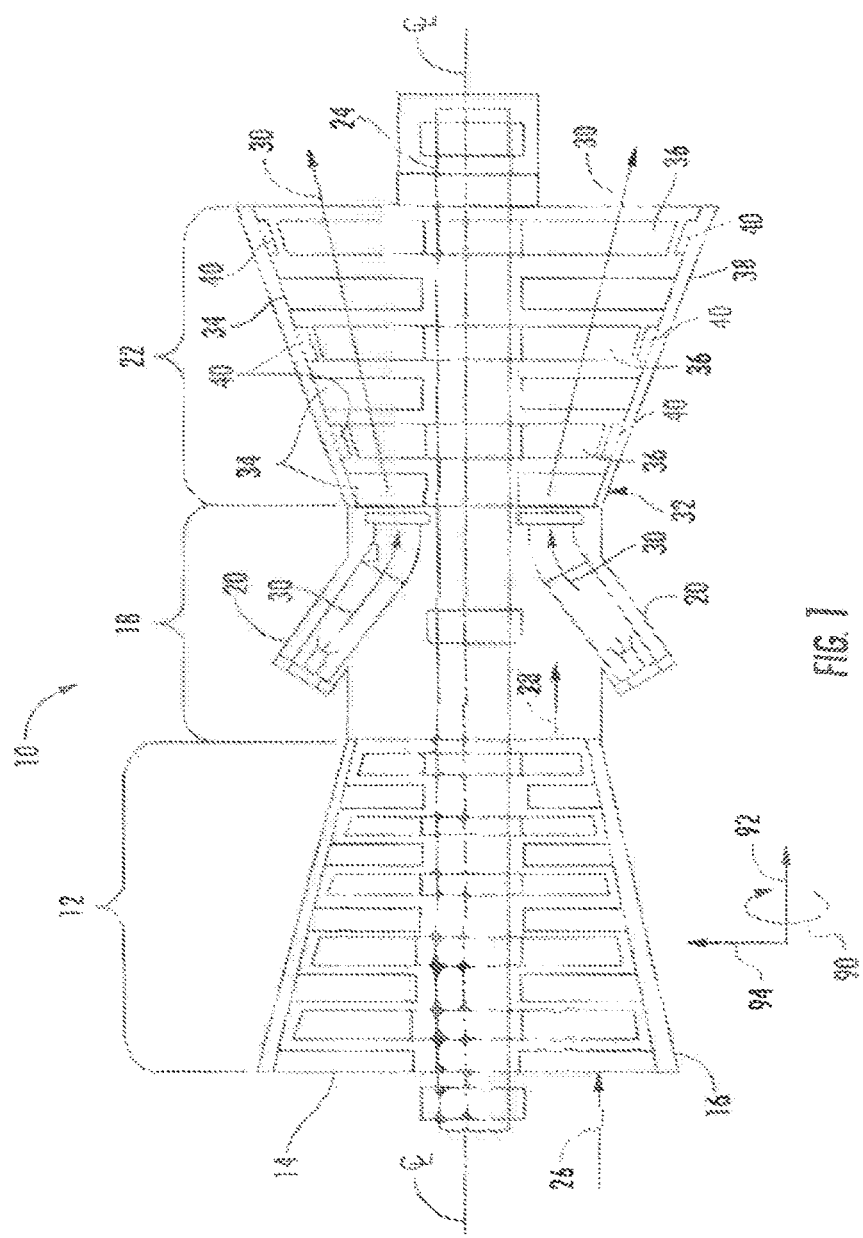
FIG. 1 is a schematic of a typical gas turbine as may incorporate embodiments of the present specification.

Repeat use of reference characters in the present specification and drawings is intended to represent the same or analogous features or elements of the present disclosure.

DETAILED DESCRIPTION

Reference will now be made in detail to present embodiments of the embodiments, one or more examples of which are illustrated in the accompanying drawings. The detailed description uses numerical and letter designations to refer to features in the drawings. Like or similar designations in the drawings and description have been used to refer to like or similar parts of the embodiments. As used herein, the terms "first", "second", and "third" may be used interchangeably to distinguish one component from another and are not intended to signify location or importance of the individual components. The terms "upstream" or "aft", and "downstream" or "forward" refer to the relative direction with respect to fluid flow in a fluid pathway. For example, "upstream" or 'aft' refers to the direction from which the fluid flows, sometimes referred to as 'rear'. "Downstream" or "forward" refers to the direction to which the fluid flows, sometimes referred to as 'front'. The term "radially" refers to the relative direction that is substantially perpendicular to an axial centerline of a particular component, and the term "axially" refers to the relative direction that is substantially parallel to an axial centerline of a particular component. The terms "circumferential" and "tangential" may refer to the direction aligned with the circumference of a rotating turbine or compressor rotor.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Each example is provided by way of explanation of the embodiments, not limitation of the embodiments. In fact, it will be apparent to those skilled in the art that modifications and variations can be made in the present embodiments without departing from the scope or spirit thereof. For instance, features illustrated or described as part of one embodiment may be used on another embodiment to yield a still further embodiment. Thus, it is intended that the present embodiments cover such modifications and variations as come within the scope of the appended claims and their equivalents. Although exemplary embodiments of the present embodiments will be described generally in the context of a gas turbine for purposes of illustration, one of ordinary skill in the art will readily appreciate that embodiments of the present embodiments may be applied to any turbomachine and is not limited to an industrial gas turbine unless specifically recited in the claims. Although an industrial, marine, or land based gas turbine is shown and described herein, the present disclosure as shown and described herein is not limited to a land based and/or industrial, and/or marine gas turbine unless otherwise specified in the claims. For example, the disclosure as described herein may be used in any type of turbine including but not limited to an aero-derivative turbine or marine gas turbine as well as an aero engine turbine, and/or aircraft engines.

Referring now to the drawings, wherein like numerals refer to like components, FIG. 1 illustrates an example of a gas turbine 10 which may incorporate various aspects of the present embodiments. As shown, the gas turbine 10 generally includes a compressor section 12 having an inlet 14 disposed at an upstream end of the gas turbine 10, and a casing 16 that at least partially surrounds the compressor section 12. The gas turbine 10 further includes a combustion section 18 having at least one combustor 20 downstream from the compressor section 12, and a turbine section 22 downstream from the combustion section 18. As shown, the combustion section 18 may include a plurality of the combustors 20. A shaft 24 extends axially through the gas turbine 10. FIG. 1 illustrates the radial 94, axial 92 and circumferential directions 90.

In operation, air 26 is drawn into the inlet 14 of the compressor section 12 and is progressively compressed to provide compressed air 28 to the combustion section 18. The compressed air 28 flows into the combustion section 18 and is mixed with fuel in the combustor 20 to form a combustible mixture. The combustible mixture is burned in the combustor 20, thereby generating a hot gas 30 that flows from the combustor 20 across a first stage 32 of turbine nozzles 34 and into the turbine section 22. The turbine section generally includes one or more rows of rotor blades 36 axially separated by an adjacent row of the turbine nozzles 34. The rotor blades 36 are coupled to the rotor shaft 24 via a rotor disk. The rotor shaft 24 rotates about an engine centerline CL. A turbine casing 38 at least partially encases the rotor blades 36 and the turbine nozzles 34. Each or some of the rows of rotor blades 36 may be concentrically surrounded by a shroud block assembly 40 that is disposed within the turbine casing 38. The hot gas 30 rapidly expands as it flows through the turbine section 22. Thermal and/or kinetic energy is transferred from the hot gas 30 to each stage of the rotor blades 36, thereby causing the shaft 24 to rotate and produce mechanical work. The shaft 24 may be coupled to a load such as a generator (not shown) so as to produce electricity. In addition, or in the alternative, the shaft 24 may be used to drive the compressor section 12 of the gas turbine.

Figure 2:
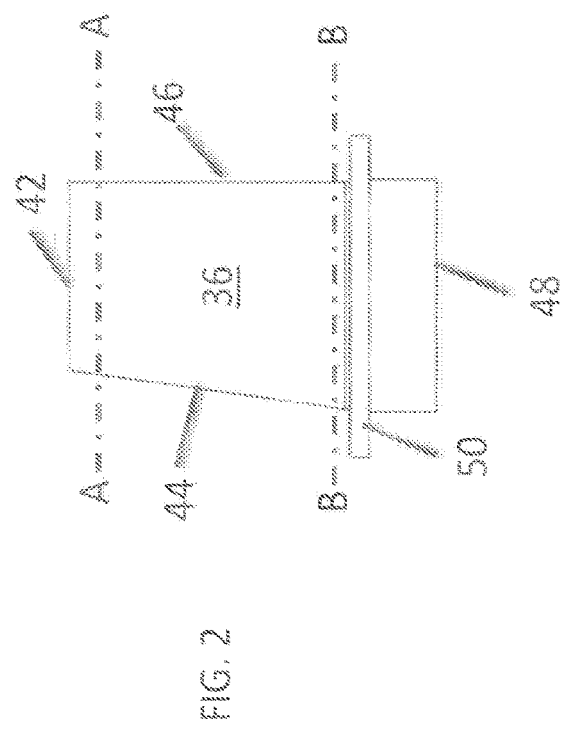
FIG. 2 is an enlarged cross section side view of portion of the turbine section including an exemplary rotor blade.

FIG. 2 provides an enlarged cross section side view of an exemplary turbine rotor blade or airfoil 36, which extends from an axially forward leading edge 44 to an axially aft trailing edge 46 and from a radially inward root 48 to a radially outer tip 42. The airfoil 36 includes a platform 50 defining a radially inner boundary of a hot gas path.

Figure 3:
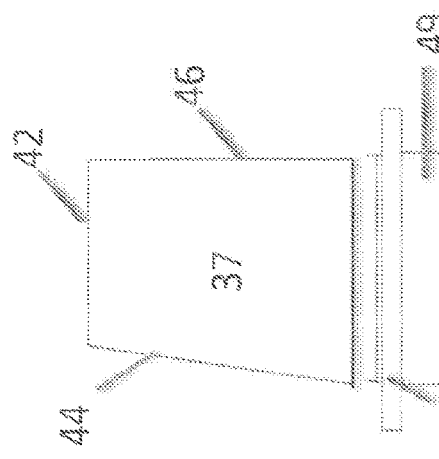
FIG. 3 is an enlarged cross section side view of a portion of the turbine section including a rotor blade.

FIG. 3 provides an enlarged cross section side view of an exemplary turbine rotor blade illustrating the airfoil body 37 detached from the airfoil root portion 49 along line B-B illustrated in FIG. 2. The turbine rotor blade includes an axially forward leading edge 44, an axially aft trailing edge 46, a radially inward root 49 and a radially outer tip 42. In the embodiment of FIG. 3, the root portion 49 and the airfoil body 37 are formed separately then joined together.

Figure 4:
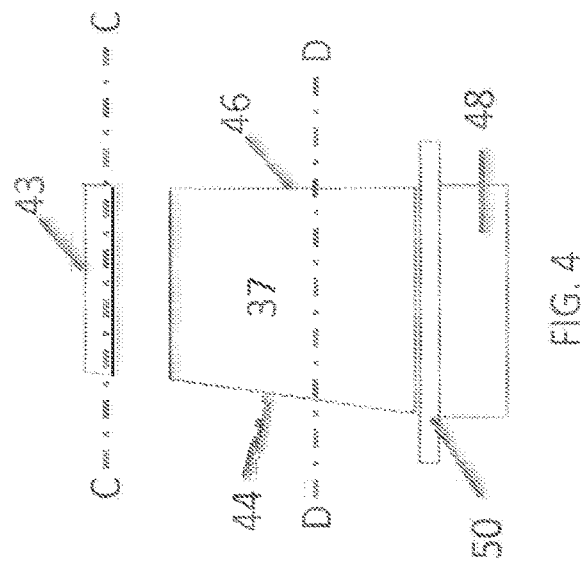
FIG. 4 is an enlarged cross section side view of a portion of the turbine section including a rotor blade.

FIG. 4 provides an enlarged cross section side view of an exemplary turbine rotor blade illustrating the airfoil tip portion 43 detached from the airfoil body 37 along line A-A illustrated in FIG. 2. The turbine rotor blade includes an axially forward leading edge 44, an axially aft trailing edge 46, a radially inward root 48 and a radially outer tip portion 43. In the embodiment of FIG. 4, the airfoil tip portion 43 and the airfoil body portion 37 are formed separately then joined together.

Airfoils composed of superalloy materials such as nickel-based superalloys and other metallic superalloys may be formed using investment casting, which produces the desired material properties for operation within a turbine section 22 of a gas turbine engine 10. However, investment casting may be limited in the fine feature details and ability to produce complex and/or high-resolution geometries with acceptable reproducibility and tolerances. For example, internal cooling channels and flow circuits of an airfoil 36 may be more simplified than desired due to the limitations of investment casting. Therefore, airfoils 36 may be cooled via long, narrow passages placed near the skin of the airfoil via a STEM (Shaped Tube Electrochemical Machining) drilling process. STEM drilling may be used to place channels into an airfoil body portion 37 formed via investment casting without a tip portion 43 and/or without an airfoil root portion 49.

FIG. 5 illustrates a perspective view of an airfoil body portion of the present embodiments. The airfoil body portion 37 extends from a leading edge 44 to a trailing edge 46, from a pressure side 50 to a suction side 52, and from a radially inner end 47 to a radially outer end 45. The airfoil body portion 37 may include a plurality of radial cooling passages 54.

Figure 6:
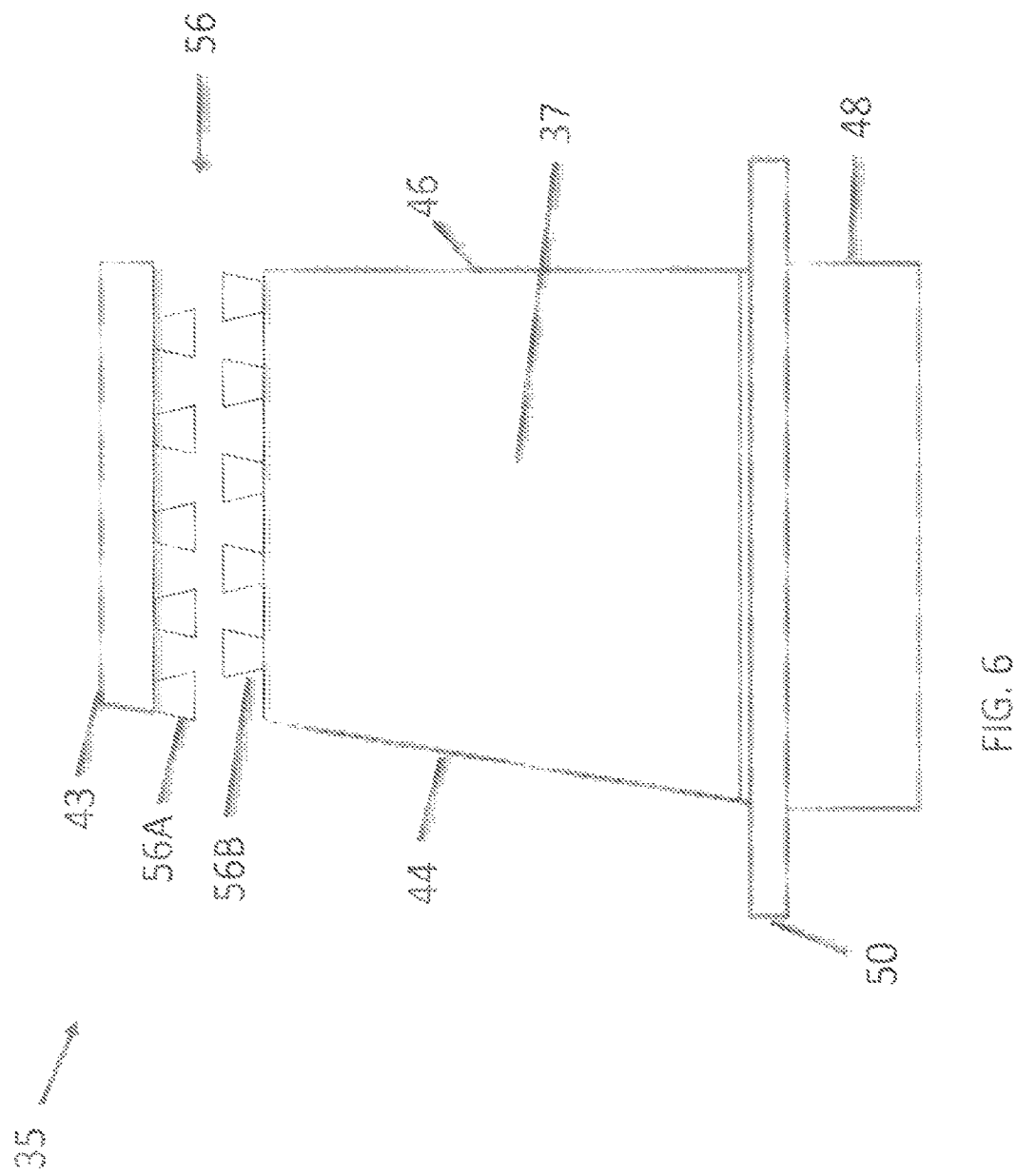
FIG. 6 illustrates a side view of an airfoil assembly including an airfoil body portion and an airfoil tip portion.

FIG. 6 illustrates a side view of an airfoil assembly 35 including an airfoil body portion 37 which may be formed separately from an airfoil tip portion 43. The airfoil body portion 37 extends from a leading edge 44 and a trailing edge 46 and connects to a radially inner airfoil root 48 at an airfoil platform 50. Each of the airfoil body portion 37 and the airfoil tip portion 43 include a plurality of teeth 56 that interlock with each other and mechanically couple the airfoil tip portion 43 to the airfoil body portion 37. The plurality of teeth 56 includes a first plurality of teeth 56A extending radially inward from the airfoil tip portion 43 toward the airfoil body portion 37. The first plurality of teeth 56A may be trapezoidal and/or triangle shaped and/or other shapes such that each is wider at a radially inner edge than at a radially outer edge, where each is mechanically coupled to the airfoil tip portion 43. The plurality of teeth 56 also includes a second plurality of teeth 56B extending radially outward from the airfoil body portion 37 toward the airfoil tip portion 43. The second plurality of teeth 56B may be trapezoidal and/or triangle shaped such that each is wider at a radially outer edge than at a radially inner edge, where each is mechanically coupled to the airfoil body portion 37. Each of the first and second pluralities of teeth 56A, 56B are spaced apart such that a complementary space separates each tooth from an adjacent tooth.

Figure 7:
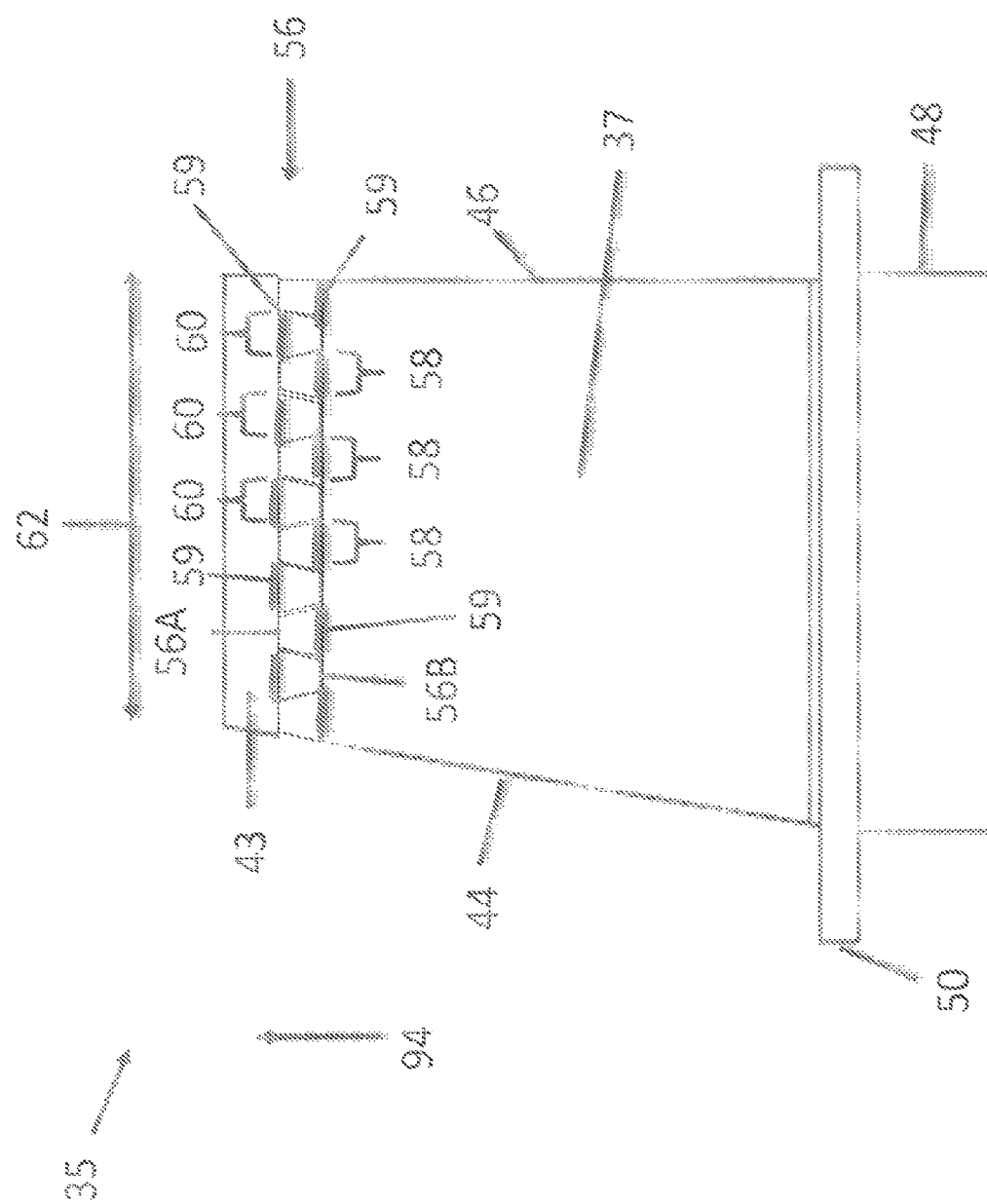
FIG. 7 illustrates a side view of airfoil assembly including an airfoil body portion and an airfoil tip portion.

FIG. 7 illustrates a side view of the airfoil assembly 35 of FIG. 6 with the airfoil tip portion 43 interlocked with the airfoil body portion 37. During assembly, the airfoil tip portion 43 may be slid sideways (i.e., perpendicular to the paper/plane of the figure/into the page) into place connecting with the airfoil body portion 37 such that each tooth of the first plurality of teeth 56A fills a complementary space between teeth of the second plurality of teeth 56B. Similarly, each tooth of the second plurality of teeth 56B fills a complementary space between teeth of the first plurality of teeth 56A. The teeth of the first and second pluralities of teeth 56A, 56B alternate with each other around a periphery of the airfoil assembly 35. When in an interlocking arrangement such as the one illustrated in FIG. 7, the first and second pluralities of teeth 56A, 56B prevent the airfoil tip portion 43 from detaching from the airfoil body portion 37 in a radial direction 94. The interlocking arrangement illustrated in FIG. 7 may be used with embodiments that also use other methods of joining the airfoil tip portion 43 to the airfoil body portion 37, such as welding and/or brazing.

Still referring to FIG. 7, a first plurality of braze surfaces 58 may act as interface surfaces for joining the radially inner edges of the first plurality of teeth 56A with the airfoil body portion 37, via fill material 59 (such as braze material, or other material that is deposited during a joining or bonding process such as brazing, welding, TCP (tool center point) brazing and/or friction stir welding). Similarly, a second plurality of braze surfaces 60 may act as interface surfaces for joining the radially inner edges of the second plurality of teeth 56B with the airfoil tip portion 43. The collective length of the first plurality of braze surfaces 58 and the second plurality of braze surfaces 60 may be greater than the length of an airfoil chord 62, when measured at the interface between the airfoil body portion 37 and the airfoil tip portion 43. The interlocking arrangement of FIG. 7 therefore allows the surface area available for brazing and/or welding to be increased, thereby strengthening the physical connection between the airfoil tip portion 43 and the airfoil body portion 37 via both an increased braze area as well as via the mechanically coupled interlocking features.

Figure 8:
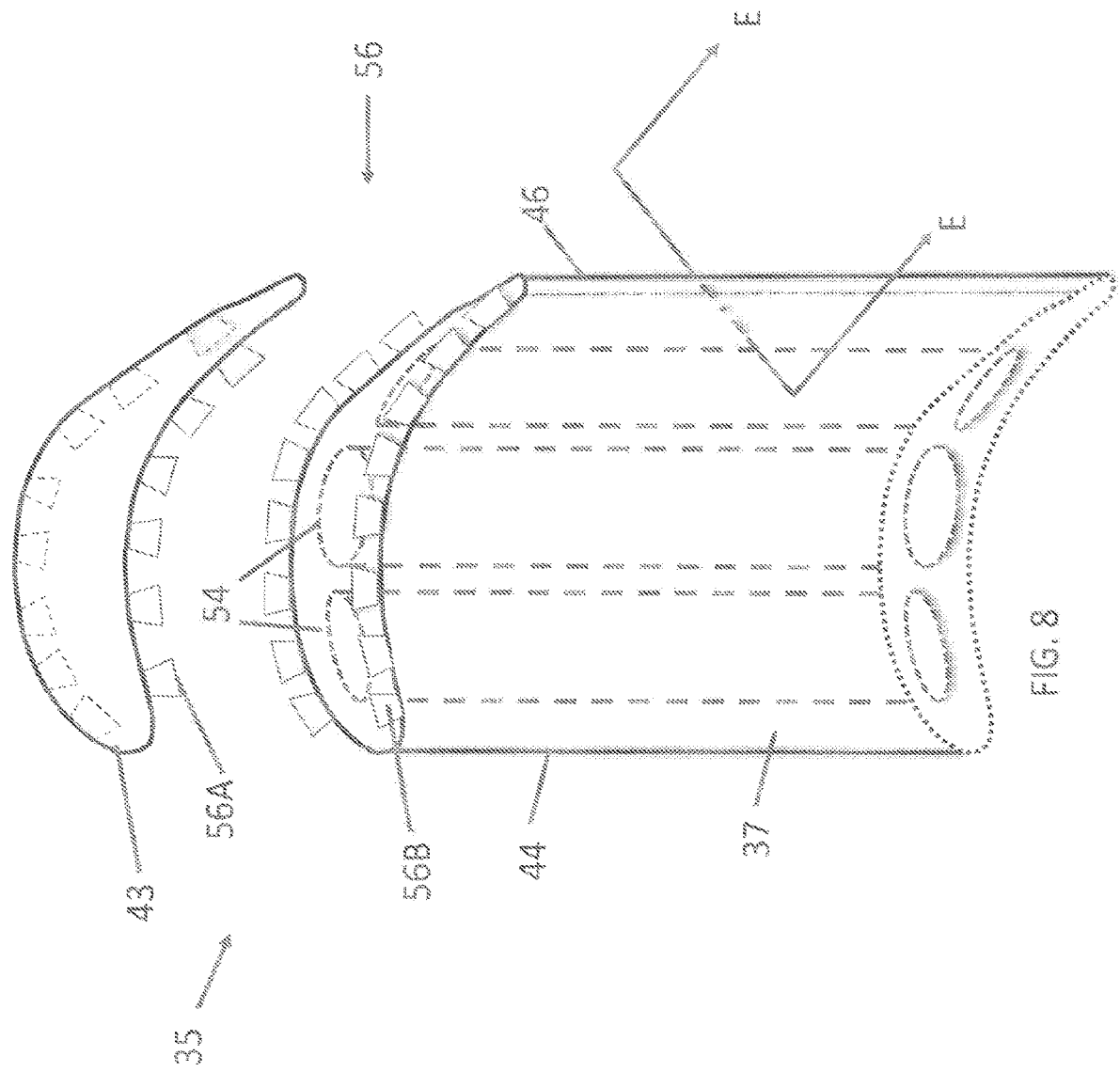
FIG. 8 illustrates a perspective view of an airfoil assembly including an airfoil body portion and an airfoil tip portion.

FIG. 8 illustrates a perspective view of the airfoil assembly 35 of FIGS. 6 and 7.

Figure 9:
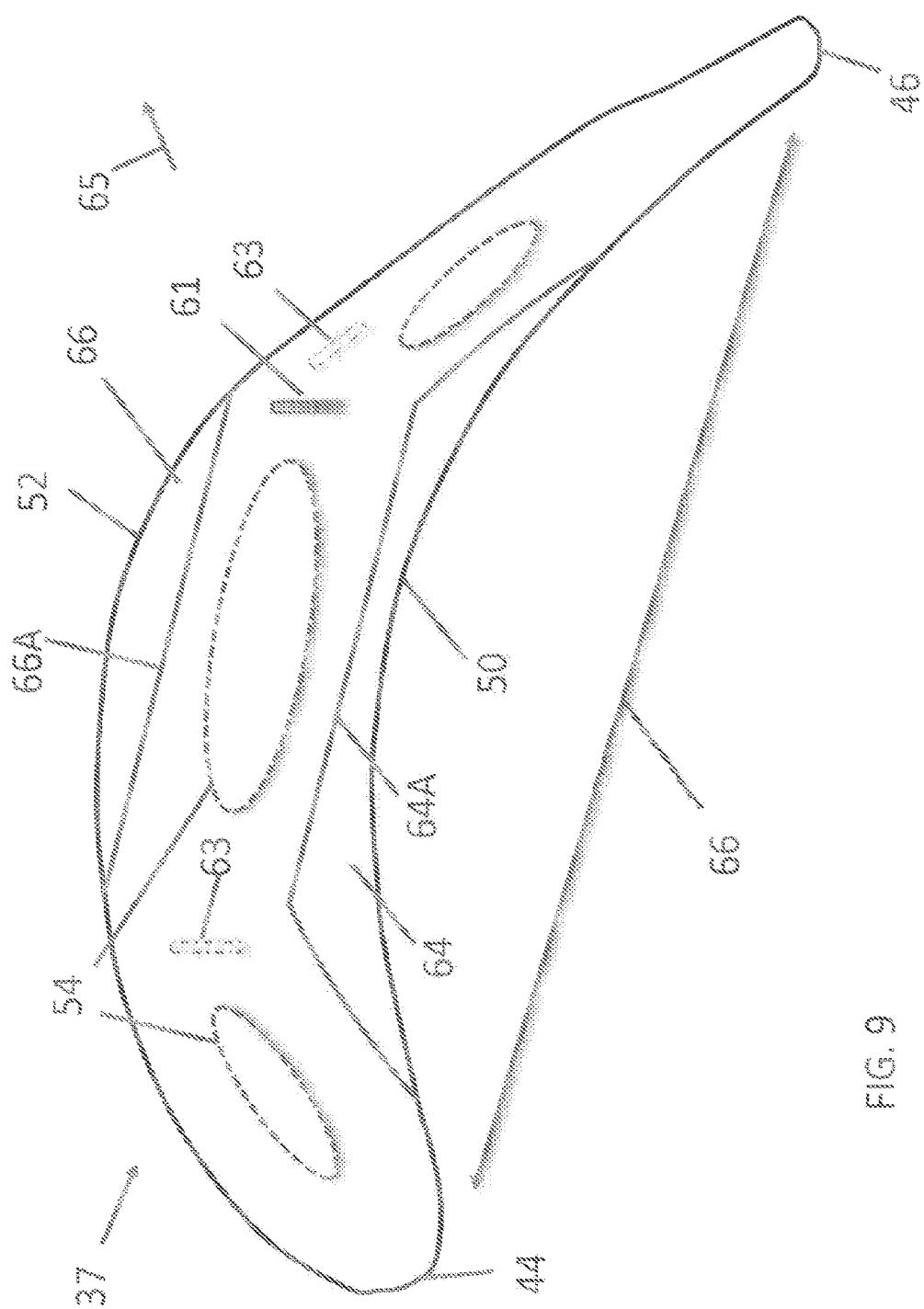
FIG. 9 illustrates a top view (radially inward looking) of an airfoil body portion.

FIG. 9 illustrates a top view (radially inward looking) of an airfoil body portion 37 stretching from a leading edge 44 to a trailing edge 46 and from a pressure side 50 to a suction side 52. The airfoil body portion 37 includes a plurality of radial cooling channels 54. FIG. 9 also, illustrates a first grooved rail 64 adjacent the pressure side 50 and extending radially outward from the top of the airfoil body portion 37. A second grooved rail 66 adjacent the suction side 52 extends radially outward from the top of the airfoil body portion 37. The first and second grooved rails 64, 66 include first and second chordwise portions 64A and 66A, respectively, which are substantially parallel to each other. For example, the orientations of each of the first and second chordwise portions 64A and 66A may be less than 10 degrees, less than 5 degrees, less than 3 degrees, less than 1 degree, and/or less than 0.5 degrees from each other, and/or from the orientation of the airfoil chord 62. For example, in one embodiment, the first and second chordwise portions 64A and 66A are oriented less than 0.5 degrees from each other and less than 10 degrees from the airfoil chord 62. The first and second grooved rails 64, 66 may include one or more grooves, notches or other features (not shown) that, when assembled with an airfoil tip portion 43 prevent the airfoil tip portion 43 from radially disconnecting from the airfoil body portion 37.

Still referring to FIG. 9, a mechanical stop 61 may be disposed at the radially outward side of the airfoil body portion 37 proximate one end of the first and second grooved rails 64, 66 so as to secure the airfoil tip portion 43 in place when it is assembled with the airfoil body portion 37. The mechanical stop 61 may extend radially outward from the top or radially outward side of the airfoil body portion 37 such that it engages with the airfoil tip portion 43 (or a corresponding portion thereof), thereby preventing the airfoil tip portion 43 from sliding off the airfoil body portion 37. One or more secondary mechanical stops 63 may also be disposed at the radially outward side of the airfoil body portion 37 in different locations, shapes and/or orientations, in addition to or in place of the mechanical stop 61. During operation, due to rotation of the turbine airfoil 36, a net force acts on the airfoil assembly 35 in a force direction 65, thereby pushing the airfoil tip portion 43 against the mechanical stop 61, and preventing the airfoil tip portion 43 from sliding away from the airfoil body portion 37 on the side of the airfoil body portion 37 with a mechanical stop 61. The net force acting in force direction 65 causes the airfoil tip portion 43 and airfoil body portion 37 to remain attached in addition to any fill material (such as braze material) that may achieve a similar result. The mechanical stop 61 and/or secondary mechanical stops 63 may also aid in aligning and/or locating the airfoil tip portion 43 with the airfoil body portion. In addition, the first and second chordwise portions 64A and 66A may be tapered so that they are not exactly parallel but instead converge slightly (for example from about 0.5 degrees to about 5 degrees, or from about 1 degree to about 4 degrees, or about 2 degrees to about 3 degrees), thereby acting as a mechanical stopping mechanism, in addition to or instead of the mechanical top 61 and/or secondary mechanical stops 63.

Figure 10:
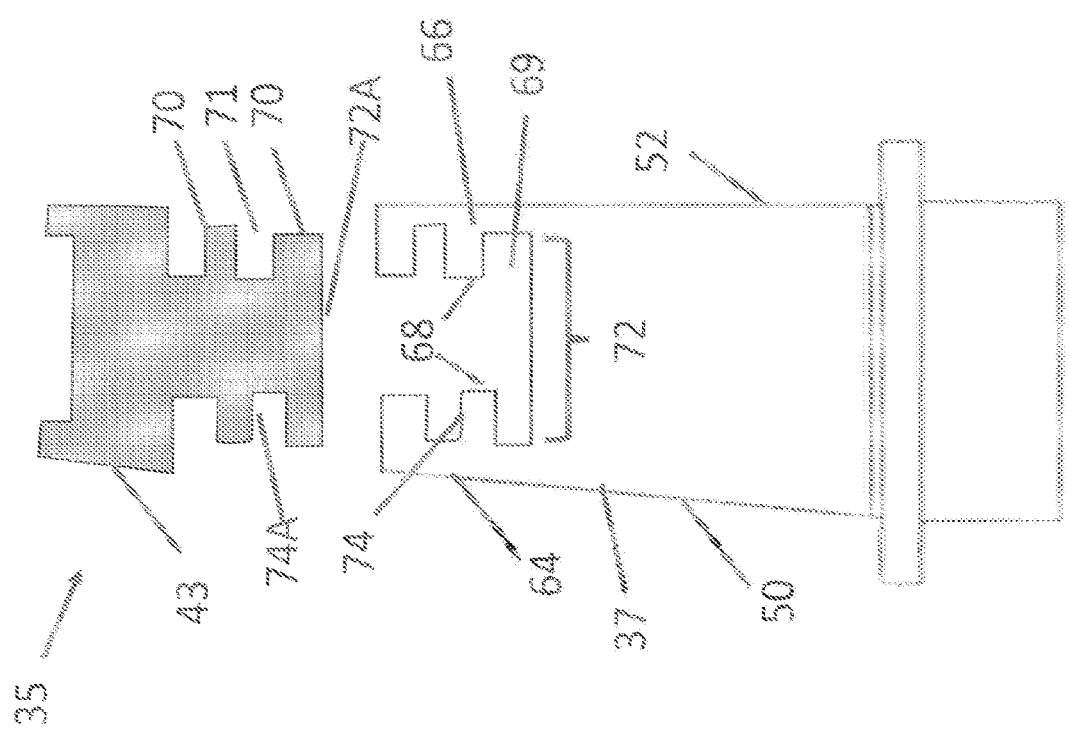
FIG. 10 illustrates an aft-looking-forward view of an airfoil assembly.

FIG. 10 illustrates an aft-looking-forward view of an airfoil assembly 35 including an airfoil tip portion 43 and an airfoil body portion 37 that may correspond to the airfoil body portion 37 of FIG. 9. Each of the first and second grooved rails 64, 66 includes at least one interlocking body features 68 and adjacent body space 69 that interfaces with at least one corresponding interlocking tip feature 70 and adjacent tip space 71. The airfoil body portion 37 may include a body primary braze area 72 that may be radially inward of the at least one interlocking body feature 68. The body primary braze area 72 interfaces with a tip primary braze area 72A such that the body primary braze area 72 and the tip primary braze area 72A interface and join during brazing and/or welding. The airfoil body 37 may include at least one secondary body braze area 74 that interfaces and joins with a corresponding secondary tip braze area 74A on the airfoil tip portion 43.

Figure 11:
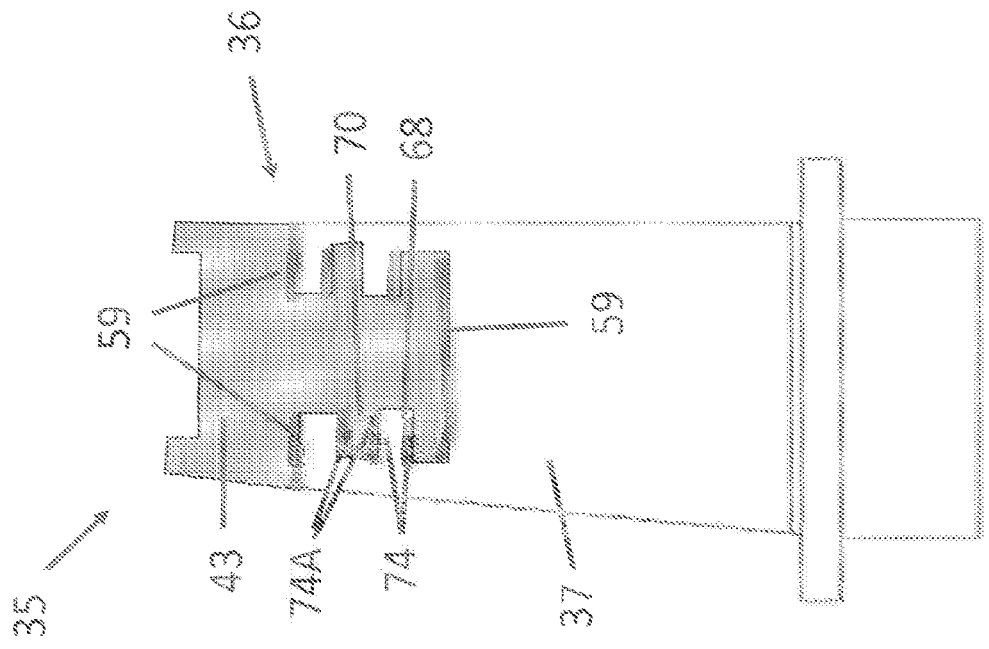
FIG. 11 illustrates an aft-looking-forward view of an airfoil assembly.

FIG. 11 illustrates an airfoil assembly 35 including an airfoil tip portion 43 and airfoil body portion 37 in accordance with FIG. 10. At least one interlocking body feature 68 may include more than one secondary body braze area 74 such that both the radially inner and the radially outer portions of the at least one interlocking body feature 68 are used as braze or bond surfaces. Fill material 59 (such as braze material) is disposed at each, or at least one of, the primary and secondary braze areas 72, 74 and/or 74A. Similarly, at least one interlocking tip feature 70 may include more than one secondary tip braze area 74A such that both the radially inner and the radially outer portions of the least one interlocking tip feature 70 are used as braze surfaces. FIG. 11 illustrates that a braze surface of the least one interlocking body feature 68 may be radially outward of and joined to a braze surface of at least one interlocking tip feature 70, even though the airfoil body portion 37 is generally radially inward of the airfoil tip portion 43.

Figure 12:
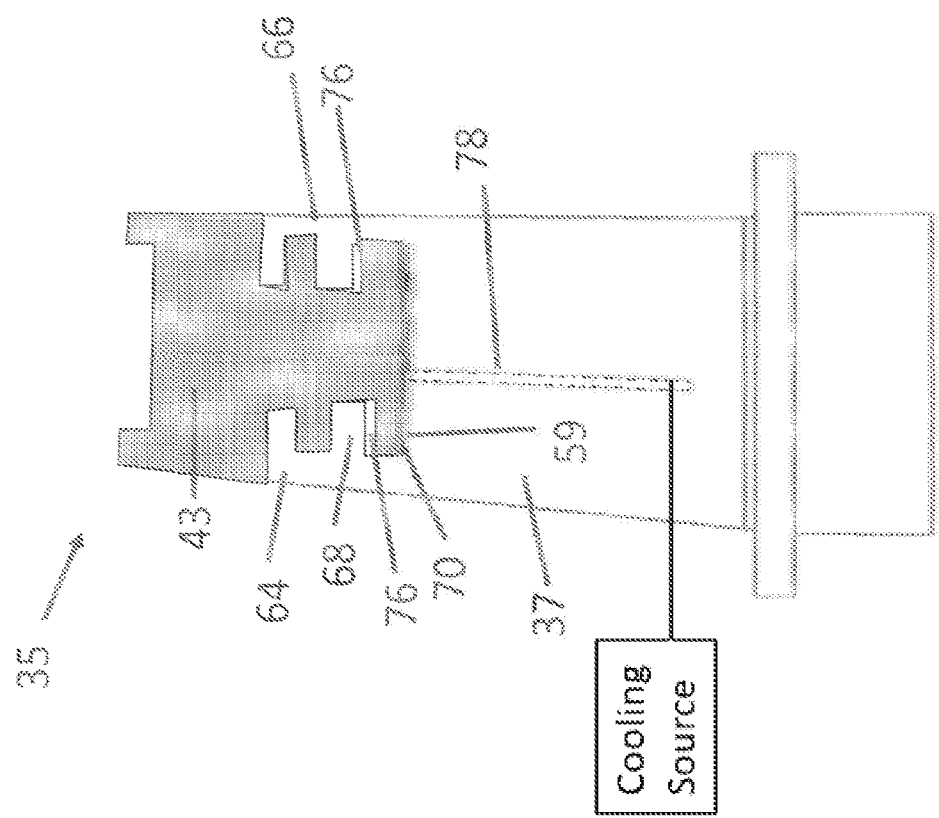
FIG. 12 illustrates an aft-looking-forward view of an airfoil assembly.

FIG. 12 illustrates an aft-looking-forward view of an airfoil assembly 35 including an airfoil body portion 37 and an airfoil tip portion 43. The airfoil assembly 35 may include at least one dead cavity 76 that forms a radial gap between a radially inward surface of least one interlocking body feature 68 and a radially outward portion of a least one interlocking tip feature 70. In some embodiments, the at least one dead cavity 76 is not fluidly connected to other cavities within the airfoil assembly 35. The airfoil assembly 35 also may include one or more adaptive cooling passages 78. The one or more adaptive cooling passages 78 is closed at one end by the airfoil tip portion 43 such that the fill material 59 (such as braze material) disposed at the airfoil tip portion 43 forms a portion of the wall of the one or more adaptive cooling passages 78. The one or more adaptive cooling passages 78 is open at an upstream end to a cooling fluid source (not shown). Cooling fluid does not flow out of the one or more adaptive cooling passages 78 when the airfoil tip portion 43 is forming a portion of the wall of the one or more adaptive cooling passages 78, thereby enclosing the cavity.

Figure 13:
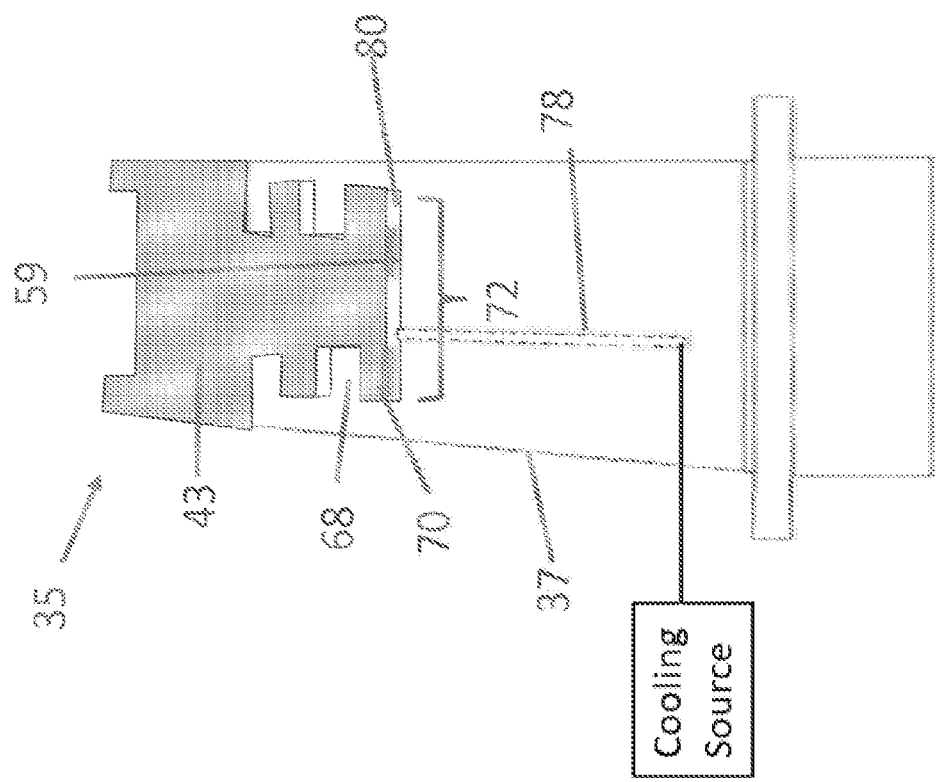
FIG. 13 illustrates an aft-looking-forward view of an airfoil assembly.

FIG. 13 illustrates an aft-looking-forward view of an airfoil assembly 35 including an airfoil body portion 37 and an airfoil tip portion 43. FIG. 13 illustrates an embodiment in which the airfoil tip portion 43 becomes unbonded from the airfoil body portion 37 at a primary bonding surface 72, due to, for example, a discontinuity in the fill material 59 (such as braze material). The airfoil tip portion 43 is repositioned in a radially outward portion when compared to the embodiment of FIG. 12. The body and tip interlocking features 68, 70 radially hold the airfoil tip portion 43 to the airfoil body portion 37. The one or more adaptive cooling passages 78 are now open to at least one activated cavity 80 due to the movement of the airfoil tip portion 43 relative to the airfoil body portion 37. Cooling fluid flows from the cooling fluid source through the one or more adaptive cooling passages 78 to the at least one activated cavity 80 thereby providing addition cooling the airfoil tip portion 43 when a braze interface has become fully or partially unbonded. In some embodiments, the activated cavity 80 may include surfaces that were previously used as braze surfaces. In other embodiments, the activated cavity 80 may include surfaces that were not previously used as braze surfaces.

In the arrangement of FIG. 13, additional cooling flows to the activated cavity 80 only when there has been sufficient relative movement between the airfoil tip portion 43 and the airfoil body portion 37 to allow the one or more adaptive cooling passages 78 to become open at the end that was previously closed. Stated otherwise, cooling fluid only flows to the activated cavity 80 when there is a discontinuity in the fill material 59 (for example braze material, weld material, tool center point (TCP) braze material or friction stir weld material) at the primary and/or secondary bonding surface 72, 74, thereby opening a passage through which the cooling fluid can flow. Referring to FIGS. 10-13, if the bond plane where braze and/or other fill material 59 is located (i.e., the primary and/or secondary bonding surface 72, 74) fractures, radial movement of the airfoil tip portion 43 may occur relative to the airfoil body portion 37. The bond plane (i.e., the primary and/or secondary bonding surface 72, 74) may fracture as a result of a spallation or rub event, or when a discontinuity is present within the bond or fill material 59. Interlocking features 68 and 70 constrain the radial movement and as such are dispositioned to allow movement only within a predetermined threshold. Radial movement only within a predetermined threshold, in turn, may allow at least one adaptive cooling passage 78 to begin flowing cooling fluid, thereby providing additional cooling to the area of the braze or fill interface, which may mitigate hot spots, cold spots, and/or high thermal gradients.

Figure 14:
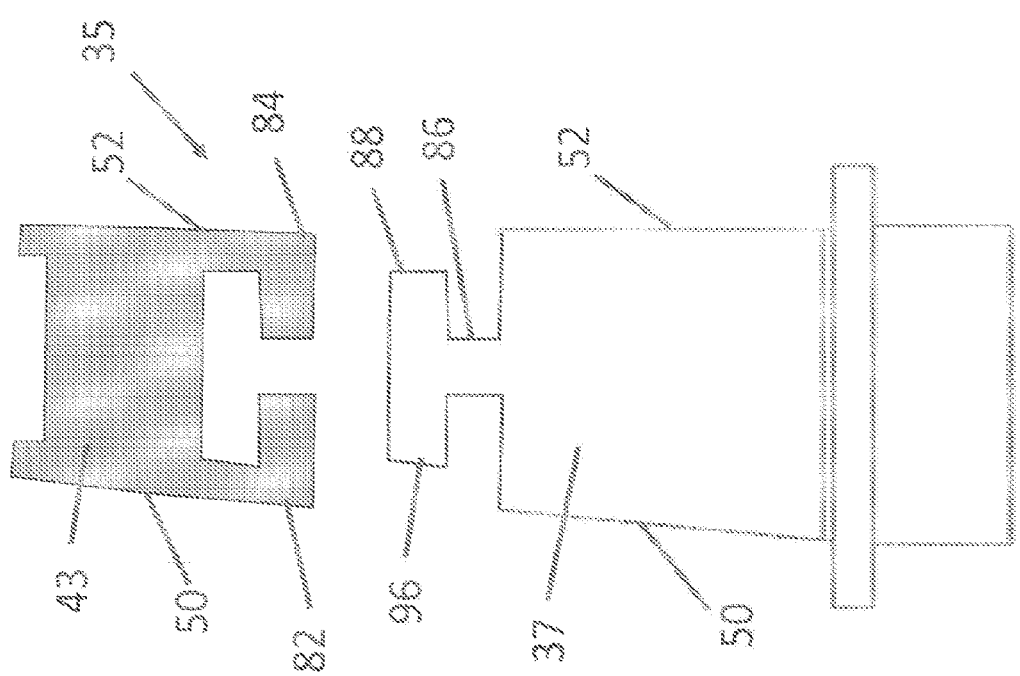
FIG. 14 illustrates an aft-looking-forward view of an airfoil assembly.

FIG. 14 illustrates an aft-looking-forward view of an airfoil assembly 35 including an airfoil body portion 37 and an airfoil tip portion 43. In the embodiment of FIG. 14, airfoil tip portion 43 includes a pressure side arm 82 which extends radially inward and then turns toward the airfoil suction side 52. Similarly, the airfoil tip portion 43 includes a suction side arm 84 which extends radially inward and then turns toward the airfoil pressure side 50. The airfoil body portion 37 includes a central member 86 extending radially outward and connecting to first and second tangs 88, 96. The first tang 88 extends toward an airfoil suction side. The second tang 96 extends toward the airfoil pressure side.

Figure 15:
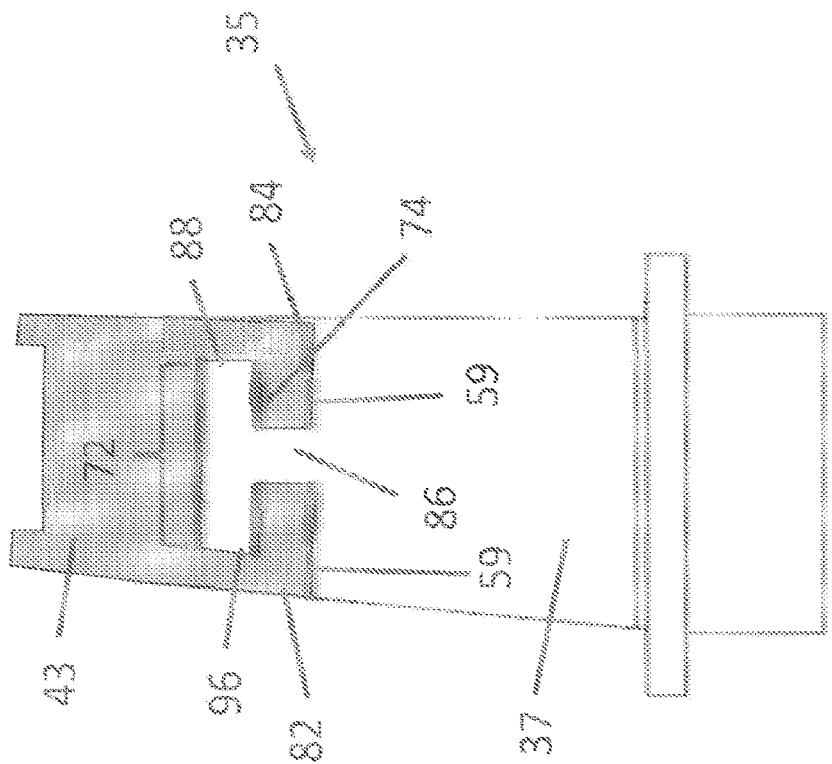
FIG. 15 illustrates an aft-looking-forward view of an airfoil assembly.

FIG. 15 illustrates an aft-looking-forward view of an airfoil assembly 35 including an airfoil body portion 37 and an airfoil tip portion 43. In the embodiment of FIG. 15, pressure side arm 82 and the suction side arm 84 of the airfoil tip portion 43 extend around the central member 86, first and second tangs 88, 96 of the airfoil body portion 37. The arrangement of FIG. 15 allows the airfoil tip portion 43 to be mechanically coupled to the airfoil body portion 37. In addition, the embodiment of FIG. 15 may include a primary braze area 72 as well as at least one secondary braze area 74, which may include a smaller area than the primary braze area 72, each braze area with fill material 59 (such as braze material) disposed thereupon. The arrangement of FIGS. 14 and 15 allows the central member 86 to be under radial tensile stress resulting from the rotation of the airfoil tip portion 43 (and inertial forces thereof) in operation, thereby placing radial tensile stresses in a centralized (relatively cooler) location away from the perimeter of the airfoil where thermal stresses may be greater.

FIG. 16 illustrates an embodiment of an airfoil assembly 35 including a first portion 98 that is joined to a second portion 100 along a braze seam 102. The braze seam 102 is connected to a slot gap 104 that, along with the braze seam 102 forms the interface between the first portion 98 and the second portion 100. Fill material 59 (such as braze material) is disposed within the braze seam 102. The braze seam is adjacent to a first airfoil assembly edge 106. The slot gap 104 is adjacent to a second airfoil assembly edge 108. A thermal barrier coating (TBC), environmental barrier coating (EBC), bond coat and/or other coating 112 may be disposed on the outer surface of the first and/or second airfoil assembly edges 106, 108. In addition, a hot fluid may flow in a substantially parallel direction 110 to the first and/or second airfoil assembly edges 106, 108. The first and second airfoil assembly edges 106, 108 may be leading edges, trailing edges, suction sides and/or pressure sides of an airfoil and/or opposing surfaces or substrates of a cooled component. The slot gap 104 may be angled partially backward from the point of view of the hot fluid flowing in direction 110. The braze seam 102 forms a closed end of an adaptive cooling passage 78 that is in fluid communication with a cooling source (not shown). In operation, cooling fluid does not flow from the adaptive cooling passage 78 into the braze seam 102 unless the fill material 59 at the braze seam 102 becomes cracked. If the fill material 59 at the braze seam 102 becomes cracked, cooling fluid may flow from the adaptive cooling passage 78 into the braze seam 102, then into the slot gap 104, eventually exiting the airfoil at the first and/or second airfoil assembly edges 106, 108. The cooling fluid flowing through the cracked and/or unbonded braze seam 102 and the slot gap 104 provides additional cooling to the first and/or second portions 98, 100 evening out thermal gradients and reducing localized hot spots and/or cold spots.

FIG. 17 illustrates an embodiment of an airfoil assembly 35 including a first portion 98 that is joined to a second portion 100 along first and second braze seams 102A, 102B. The first and second braze seams 102A, 102B are connected to opposing sides of an adaptive cavity 114 that, along with the first and second braze seams 102A, 102B, forms the interface between the first portion 98 and the second portion 100. The first braze seam 102A may be adjacent a first airfoil assembly edge 106 while the second braze seam 102B may be adjacent a second airfoil assembly edge 108. A thermal barrier coating (TBC), environmental barrier coating (EBC), bond coat and/or other coating 112 may be disposed on the outer surface of the first and/or second airfoil assembly edges 106, 108. In addition, a hot fluid may flow in a substantially parallel direction 110 to the first and/or second airfoil assembly edges 106, 108. The first and second airfoil assembly edges 106, 108 may be leading edges, trailing edges, suction sides and/or pressure sides of an airfoil and/or opposing surfaces or substrates of a cooled component. The adaptive cavity 114 may have a rectangular, triangular, trapezoidal, square or polygonal cross section or may have a cylindrical, spherical or polyhedron geometry. The adaptive cavity 114 forms an open end of an adaptive cooling passage 78 that is in fluid communication with a cooling source (not shown). In operation, cooling fluid may flow from the adaptive cooling passage 78 into the adaptive cavity 114 but then does not flow into the first and/or second braze seams 102A, 102B unless at least one of the first and second braze seams 102A, 102B becomes cracked. Fill material 59 (such as braze material) is disposed within each of the first and second braze seams 102A, 102B. If the fill material 59 at the first and second braze seams 102A, 102B becomes cracked and/or discontinuous, cooling fluid may flow from the adaptive cooling passage 78 into the adaptive cavity 114, then to at least one of the first and second braze seams 102A, 102B, eventually exiting the airfoil at the first and/or second airfoil assembly edges 106, 108. In other embodiments, the adaptive cooling passage will connect directly to the first and/or second braze seams 102A, 102B. Other embodiments may not include an adaptive cavity 114 or a slot gap 104. The cooling fluid flowing through the cracked and/or unbonded first and second braze seams 102A, 102B and the adaptive cavity 114 provides additional cooling to the first and/or second portions 98, 100 evening out thermal gradients and reducing localized hot spots and/or cold spots.

Figure 18:
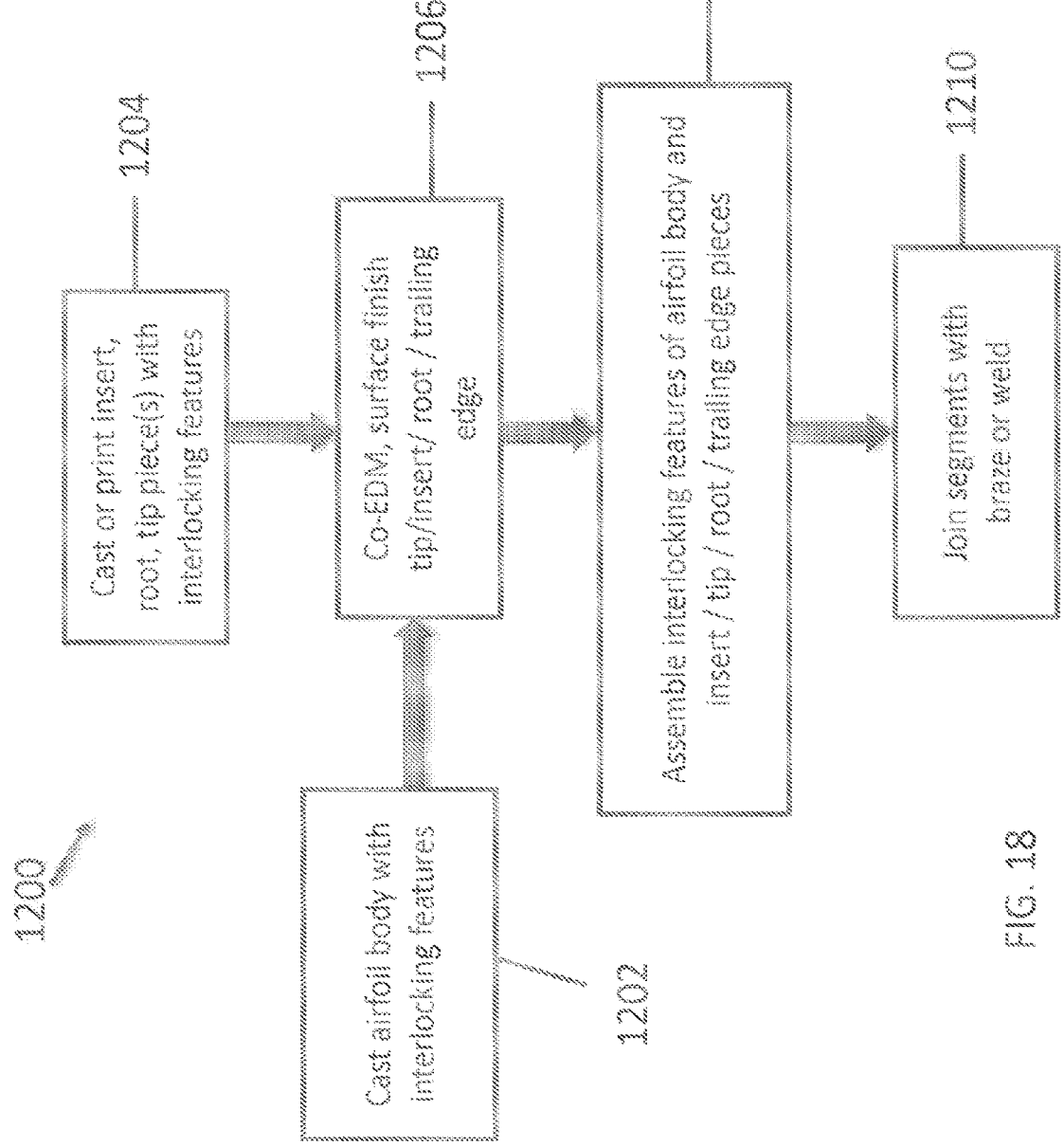
FIG. 18 illustrates a method of forming an airfoil, according to various embodiments of the present disclosure.

FIG. 18 illustrates a method 1200 of forming an airfoil 36 according to the present embodiments. At step 1202, an airfoil body portion 37 with interlocking features is cast using investment casting. At 1204, an airfoil tip portion 43 with interlocking features is formed via additive manufacturing, investment casting or another forming processes. Also at 1204, an insert for an airfoil 36 with interlocking features, a trailing edge portion for an airfoil 36 with interlocking features, and/or an airfoil root portion 49 with interlocking features may be formed via additive manufacturing, investment casting or another forming processes. In some embodiments, only the airfoil tip portion 43 will be formed separately from the casting of the airfoil body portion 37. In other embodiments, the airfoil tip portion 43, the airfoil root portion 49, a trailing edge portion, and/or an insert of the airfoil 36 will each be formed separately from the casting of the airfoil body portion 37. In other embodiments, the airfoil tip portion 43, the airfoil root portion 49 and the insert of the airfoil 36 will all be formed via casting during the casting of the airfoil body portion 37. At 1206, the method includes co-drilling (via electrical discharge machining (EDM) or other process) the airfoil body portion 37 along with the other portions that may be formed separately such as but not limited to the airfoil tip portion 43, the airfoil root portion 49, an airfoil trailing edge 46, the airfoil leading edge 44, and an insert of the airfoil 36. Method step 1206 may also include pre-assembling the various components prior to EDM. As used herein, an "insert" is a component that may be inserted within an airfoil (rotating or stationary) for providing cooling such at impingement cooling, or for providing some other function.

Still referring to FIG. 18, method step 1206 may also include surface finishing of, for example, an airfoil body portion 37 and an airfoil tip portion 43 such that interfacing surfaces are smooth prior to assembly, thereby allowing interfacing surfaces to have large mating areas with few or no irregularities greater than a predefined tolerance. Method step 1206 may also include pre-coating components (for example following surface finish and/or co-drilling) with fill material 59 such as braze material, prior to assembly. At 1208, the method includes assembling the interlocking features of the individual airfoil components including the airfoil body portion 37, along with the airfoil tip portion 43, the airfoil root portion 49, the trailing edge portion, and/or an insert of the airfoil 36. For example, the airfoil body portion 37 and the airfoil tip portion 43 may undergo electrical discharge machining (EDM) concurrently at interfacing surfaces of each to enhance mating of interfacing surfaces during brazing, which may permit defects of no greater than 1-2 mils (i.e., 1-2 thousandths of an inch). At 1210, the method includes joining the portions of the airfoil 36 together via brazing, welding or other method of joining. In one embodiment, the airfoil body portion 37 and the airfoil tip portion 43 are joined via a braze interface resulting from a brazing process. Other steps may be included following step 1210 including, but not limited to, heat treatment, surface finishing, polishing, de-burring, coating, as well as others. In addition, other steps may be included throughout the process such as post-process steps after the airfoil tip portion 43 and/or other subcomponents of the airfoil 36 are formed, but prior to assembly. In addition, one or more of the steps included in FIG. 18 may not be performed in some embodiments.

The method illustrated in FIG. 18 allows the airfoil 36 and various subcomponents thereof to maintain an open topology until they are joined together at step 1210, which enhances the manufacturability of the various subcomponents of the airfoil 36 as well as the internal features thereof.

For each of the embodiments shown in FIGS. 6-8 and 10-15, the interlocking features provide increased surface area of the collective interfacing surfaces of airfoil body portion 37 and the airfoil tip portion 43, thereby increasing the allowable area over which brazing may occur, which may enhance the overall strength of the braze. The methods and embodiments disclosed herein may apply to any hot gas component, other components of gas turbine engines as well as other components. For example, the present claimed methods and embodiments may apply to components that include at least two joining portions where both a primary retention mechanism (for example joining via fill material 59 such as braze material, weld material, friction stir weld material, TCP (tool center point) braze material, and other joining materials) and a secondary retention mechanism (for example interlocking features, dovetails, teeth, shiplap, pins, hocks, grooves, notches, and/or other mechanisms) are desired. In addition, one or more interference fits may be used as a tertiary retention means and/or in place of the primary or secondary retention means. For example, interference fits may be used in connection with braze and/or weld joints. In other embodiments, interference fits may be used in connection with interlocking features. In other embodiments, interference fits may be used in connection with both interlocking features and braze and/or weld joints. For example, a first interference portion of an airfoil tip portion 43 may be cold-fitted into a corresponding second interference portion of an airfoil body portion 37 such that the two mating portions form an interference fit at temperature, in addition to braze and/or weld material being used at the same interface(s).

The present claimed methods and embodiments may apply to components that include, but are not limited to, turbine airfoils such as rotating turbine blades and stationary nozzles and/or vanes, struts, shrouds, compressor blades, fan blades, compressor vanes, sumps, bearings, diffusors, combustor liners, fuel injectors, gears, impellers, rotor discs and hubs, seals, manifolds, dampers, gaskets, casings, shafts, flow path walls, airfoil platforms, inlet guide vanes, fairings, exhaust nozzles, fuel nozzles, swirlers, compressor components, turbine components, combustor components, fan module components, gear box components, as well as other components, sub-components and assemblies thereof. The embodiments of FIGS. 6-15 may also include at least one mechanical stop 61, secondary mechanical stop 63 and/or tapered portion to prevent movement of the airfoil tip portion 43 relative to the airfoil body portion 43 in at least one direction.

The airfoils 36 of the present embodiments may be rotating airfoils such as turbine blades and buckets as well as stationary airfoils such as, but not limited to, gas turbine airfoil vanes or turbine nozzle airfoils. The embodiments described herein have been written primarily in terms of interlocking mechanical features and brazing between an airfoil tip portion 43 and an airfoil body portion 37. However, such embodiments may be used between any two interfacing bonded components or sub-components including but not limited to airfoil root portions 49, airfoil leading and trailing edge portions, airfoil platforms, and portions of other components as well. By forming interlocking features in the airfoil body portion 37, airfoil tip portion 43, airfoil root portion 49, leading edge and or trailing edge, the various airfoil components can be mechanically coupled, thereby strengthening the bond between components compared to brazing alone. In addition, the interlocking features, when used in concert with brazing, allow for an increase in the areas of the interfacing surfaces between components thereby allowing more fill material 59 (such as, but not limited to, braze material) to be applied over a greater area, again strengthening the bond between components. The features of the present embodiments, including but not limited to interlocking features, adaptive cooling channels, brazed components, braze seams, primary braze areas, secondary braze areas, turbine airfoils and portions thereof, adaptive cavities, coatings, and/or other features may be used individually or in various combinations according to the present embodiments.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hot gas path component assembly comprising:
   an airfoil, the airfoil including a first component portion comprising a first set of interlocking features;
   a second component portion comprising a second set of interlocking features, the second set of interlocking features mechanically coupled to the first set of interlocking features; the first component portion is an airfoil body portion and the second component portion is an airfoil tip portion; and
   fill material disposed at an interface between at least one surface of the first set of interlocking features and at least one surface of the second set of interlocking features; and the airfoil further comprising:
   an airfoil pressure side;
   a first grooved rail adjacent the airfoil pressure side and extending radially outward from a top of the airfoil body portion;
   an airfoil suction side; and
   a second grooved rail adjacent the airfoil suction side and extending radially outward from the top of the airfoil body portion;

wherein the fill material is disposed during a joining process; and wherein the second component portion is joined to the first component portion via both the fill material and the first and second sets of interlocking features, and a majority of the first component portion is radially inward of the majority of the second component portion.

2. The hot gas path component assembly of claim 1, wherein the first and second sets of interlocking features include at least one of trapezoidal teeth, triangular teeth, a dovetail, and shiplap.

3. The hot gas path component assembly of claim 1, wherein the fill material includes braze material.

4. The hot gas path component assembly of claim 1, the airfoil body portion further comprising:

at least one mechanical stop extending radially outward from a radially outer side of the airfoil body portion;

wherein the first set of interlocking features are disposed within the first and second grooved rails, and wherein the second set of interlocking features are disposed within the airfoil tip portion; and wherein the at least one mechanical stop engages the airfoil tip portion preventing movement of the airfoil tip portion in at least one direction.

5. The hot gas path component assembly of claim 4, further comprising an adaptive cooling passage, wherein a first end of the adaptive cooling passage is fluidly connected to a cooling source;

wherein a second end of the adaptive cooling passage is disposed within the fill material at the interface between the airfoil body portion and the airfoil tip portion; and wherein cooling fluid flows into the interface between the airfoil body portion and the airfoil tip portion only if there is a discontinuity in the fill material at the interface.

6. The hot gas path component assembly of claim 5, further comprising:

a first interference portion extending radially inward from the airfoil tip portion;

a second interference portion disposed within the airfoil body portion, the second interference portion receiving the first interference portion;

at least one dead cavity, wherein the at least one dead cavity defines a radial gap between a radially inward surface of the at least one surface of the first set of interlocking features and a radially outward portion of the at least one surface of the second set of interlocking features, and wherein the at least one dead cavity is not fluidly connected to other cavities of the airfoil.

7. The hot gas path component assembly of claim 1, the interface further comprising:

a primary braze area; and a secondary braze area;

wherein the primary braze area is larger than the secondary braze area.

8. The hot gas path component assembly of claim 1, the airfoil tip portion further comprising:

a pressure side arm extending radially inward and toward the airfoil suction side; and a suction side arm extending radially inward and toward the airfoil pressure side.

9. The hot gas path component assembly of claim 8, the airfoil body portion further comprising:

a central member extending radially outward from the airfoil body portion;

a first tang connecting to the central member and extending toward the airfoil suction side; and a second tang connecting to the central member and extending toward the airfoil pressure side, wherein the pressure side arm and the suction side arm of the airfoil tip portion wrap around the central member, the first tang and the second tang of the airfoil body portion.

10. The hot gas path component assembly of claim 1, wherein at least one surface of the airfoil body portion is brazed to and radially outside of at least one surface of the airfoil tip portion.

11. A hot gas path component assembly comprising:

a first component portion comprising a first set of interlocking features;

a second component portion comprising a second set of interlocking features, the second set of interlocking features mechanically coupled to the first set of interlocking features; and fill material disposed at an interface between at least one surface of the first set of interlocking features and at least one surface of the second set of interlocking features;

wherein the fill material is disposed during a joining process; and wherein the second component portion is joined to the first component portion via both the fill material and the first and second sets of interlocking features; and further comprising an adaptive cooling passage, wherein a first end of the adaptive cooling passage is fluidly connected to a cooling source;

wherein a second end of the adaptive cooling passage is disposed within the fill material between the first component potion and the second component portion; and wherein cooling fluid flows into the interface between the first component portion and the second component portion only if there is a discontinuity in the fill material at the interface.

12. A structure comprising:

a first structure portion comprising a first set of interlocking features;

a second structure portion joined to the first structure portion, the second structure portion comprising a second set of interlocking features, the second set of interlocking features mechanically coupled to the first set of interlocking features; the first structure portion and the second structure portion collectively forming a first substrate surface, the first substrate surface exposed to hot fluid;

fill material at an interface between the first structure portion and the second structure portion; and at least one adaptive cooling passage, the at least one adaptive cooling passage comprising:

a first end fluidly connected to a cooling source; and a second end disposed at the interface between the first structure portion and the second structure portion;

wherein cooling fluid flows into the interface between the first structure portion and the second structure portion only if there is a discontinuity in the fill material, and wherein the first structure portion is an airfoil body portion; and wherein the second structure portion is an airfoil tip portion or an airfoil trailing edge portion.

13. The structure of claim 12, further comprising: at least one slot gap, the at least one slot gap comprising:

a first end disposed at the interface between the first structure portion and the second structure portion; and a second end disposed in the first substrate surface.

14. The structure of claim 12, further comprising:

at least one adaptive cavity, the at least one adaptive cavity in fluid communication with the at least one adaptive cooling passage;

a first braze seam, the first braze seam disposed between the at least one adaptive cavity and the first substrate surface;

a second substrate surface, the second substrate surface oppositely disposed from the first substrate surface; and a second braze seam, the second braze seam disposed between the at least one adaptive cavity and the second substrate surface, wherein the fill material is disposed within at least one of the first braze seam and the second braze seam.

\* \* \* \* \*